United States Patent
Spiss et al.

(10) Patent No.: US 12,048,936 B2
(45) Date of Patent: Jul. 30, 2024

(54) CENTRIFUGAL PROCESSING UNIT

(71) Applicant: TECAN TRADING AG, Mannedorf (CH)

(72) Inventors: Markus Spiss, Zurich (CH); Fred Schinzel, Mannedorf (CH); Adrian Sager, Mannedorf (CH); Markus Wolf, Mannedorf (CH)

(73) Assignee: TECAN TRADING AG, Mannedorf (CH)

( * ) Notice: Subject to any disclaimer, the term of this patent is extended or adjusted under 35 U.S.C. 154(b) by 985 days.

(21) Appl. No.: 16/624,146

(22) PCT Filed: May 16, 2018

(86) PCT No.: PCT/EP2018/062722
§ 371 (c)(1),
(2) Date: Dec. 18, 2019

(87) PCT Pub. No.: WO2019/001837
PCT Pub. Date: Jan. 3, 2019

(65) Prior Publication Data
US 2020/0171512 A1 Jun. 4, 2020

(30) Foreign Application Priority Data
Jun. 27, 2017 (EP) .................................. 17178110

(51) Int. Cl.
*B04B 5/04* (2006.01)
*B01L 3/00* (2006.01)
*B04B 13/00* (2006.01)

(52) U.S. Cl.
CPC ............ *B04B 5/0421* (2013.01); *B01L 3/502* (2013.01); *B04B 13/00* (2013.01)

(58) Field of Classification Search
CPC . G01N 2035/00495; G01N 2035/0406; G01N 21/07; B04B 5/0421; B04B 13/00;
(Continued)

(56) References Cited

U.S. PATENT DOCUMENTS 4,141,489 A * 2/1979 Wright .................. B04B 5/0421
494/20
4,236,666 A 12/1980 Aeschlimann et al.
(Continued)

FOREIGN PATENT DOCUMENTS

| ES | 2159452 A1 | 10/2001 |
|----|------------|---------|
| GB | 2539757 A  | 12/2016 |
| JP | 06-011113 Y | 3/1994 |

OTHER PUBLICATIONS

International Search Report and Written Opinion for corresponding PCT application No. PCT/EP2018/062722, mailed Jul. 19, 2018.

*Primary Examiner* — Dean Kwak
(74) *Attorney, Agent, or Firm* — Notaro, Michalos & Zaccaria P.C.

(57) ABSTRACT

A centrifugal processing unit for directing the movement of substances within a sample processing cartridge having a rotor for receiving the sample processing cartridge, a rotor drive to create a centrifugal force, the centrifugal processing unit having a pivot accommodation and a fix accommodation for receiving the sample processing cartridge that are arranged on the rotor, where each pivot accommodation being adapted to allow a free pivoting motion of the received sample processing cartridge about a respective pivot axis, and each pivot axis being orthogonal to the rotor axis to the respective force vector of the centrifugal force.

15 Claims, 4 Drawing Sheets

(58) Field of Classification Search
CPC ........... B01L 3/5021; B01L 2400/0409; B01L 3/502; B01F 35/71725
See application file for complete search history.

(56) References Cited

U.S. PATENT DOCUMENTS

2013/0199298 A1* 8/2013 Vivek ................... B01D 21/262
73/632
2013/0288873 A1 10/2013 Barbee et al.

* cited by examiner

CENTRIFUGAL PROCESSING UNIT

TECHNICAL FIELD OF THE INVENTION

The current invention relates to a centrifugal processing unit for directing the movement of substances within a sample processing cartridge.

DESCRIPTION OF THE RELATED ART

Such a centrifugal processing unit is disclosed in U.S. Pat. No. 4,236,666. It comprises two magazines for several sample containers, wherein the magazines are arranged on arms that extend outwards from an axis of rotation, opposite of each other. Each magazine is rotatable around and is slidable along a respective axle. On each arm, on one side of the respective magazine, a locking pin is arranged and each magazine comprises a corresponding recess for said locking pin. If the axis of rotation is rotated in one direction, each magazine abuts on the side of the arm without a locking pin and can rotate around its axle. If the axis of rotation is rotated in the opposite direction, each magazine slides along its axle and abuts on the side of the arm with a locking pin, thus preventing its rotation around its axle. The sliding and abutting creates an additional unwanted force vector.

SUMMARY OF THE INVENTION

It is therefore a task of the current invention to provide centrifugal processing unit for directing the movement of substances within a sample processing cartridge by means of which additional unwanted force vectors are prevented.

This problem is solved by a centrifugal processing unit with the features of claim 1. Further embodiments of the centrifugal processing unit, a centrifugal processing system, as well as a process for directing the movement of substances within a sample processing cartridge are defined by the features of further claims.

A centrifugal processing unit for directing the movement of substances within a sample processing cartridge according to the invention comprises at least one rotor for receiving the sample processing cartridge, at least one rotor drive for rotating the at least one rotor about a respective rotor axis to create a centrifugal force, a control for accelerating and decelerating the at least one rotor. The centrifugal processing unit further comprises at least one pivot accommodation and at least one fix accommodation for receiving the sample processing cartridge that are arranged on the at least one rotor. Each pivot accommodation is adapted to allow a free pivoting motion of the received sample processing cartridge about a respective pivot axis, wherein each pivot axis is orthogonal to the rotor axis and to the respective force vector of the centrifugal force.

As there is no relative movement between the rotor and the sample processing cartridge in the direction of rotation, there is no abutting and consequently no unwanted force vector. The force vector of the centrifugal force is acting on a cartridge received in a pivot accommodation in a first direction and is acting in a second direction on a cartridge received in a fix accommodation. The second direction is dependent on the rotation speed of the rotor. The faster the rotor spins, the bigger is the centrifugal force and the bigger is the angular deflection of the cartridge with respect to its position of rest. The deflection angle lies in the range from above 0 to below 90 degrees. Such a design works if the rotor is turned in one of its two directions of rotation about its rotor axis.

In the simplest design, the centrifugal processing unit comprises one rotor with one pivot accommodation and one fix accommodation that are arranged on the rotor on opposite sides thereof. This arrangement provides an equal distribution of the masses to be moved and therefore reduces vibrations due to unbalanced mass, which reduces the stress on the device. Alternatively, two, four, six, eight, ten, twelve or more pivot accommodations and fix accommodations can be arranged on the rotor. Even numbers of accommodations are easily mass balanced, when evenly distributed about the rotor. Alternatively, odd numbers of accommodations respectively rotor arms can be provided. It is advantageous to distribute the accommodations evenly around the rotor to prevent an unbalanced mass. Pivot accommodations and fix accommodations can be arranged alternately or in groups of two, three, four, five, six or more or half and half. The pivot accommodations and the fix accommodations can be arranged opposite to each other with respect to the rotor. Alternatively, they can be arranged opposite to an accommodation of the same type.

In an embodiment, the centrifugal processing unit comprises two or more rotors and wherein each rotor comprises either only pivot accommodations or only fix accommodations, which are different in design from one another. For example, the fix accommodation comprises a frame fixed to the respective rotor and has no pivot axis at all. The cartridges from a pivot accommodation associated with one rotor, can be transferred to a fix accommodation associated with another rotor and vice versa. The transfer can be one by one or the cartridges can be transferred in groups or all together.

In a further embodiment, each accommodation is adapted for receiving the sample processing cartridge in a first orientation and for receiving the sample processing cartridge in a second orientation, wherein the second orientation corresponds to an angular rotation of the sample processing cartridge about a central axis parallel to the rotor axis. In theory, any possible angle of rotation will lead to any possible resulting force vector perpendicular to the central axis parallel to the rotor axis that acts on the sample processing cartridge.

In a further embodiment, the angular rotation is a rotation about an angle greater 0 to 180 degrees, particularly 90 degrees or 180 degrees. The rotation about 180 degrees of a cartridge received in a fix accommodation resulting in the force vector of the centrifugal force acting in a third direction, wherein the third direction pointing in the opposite direction of the second direction. With such a design, the first, the second and the third direction of the force vector acting on a cartridge lie in a plane. Thus, substances within a sample processing cartridge can be moved within that plane.

According to an embodiment, the at least one accommodation comprises a frame for receiving the sample processing cartridge. A frame allows the reception of a variety of different cartridges. The frame of the pivot accommodation can pivot about the pivot axis. The pivoting of the fix accommodation is prevented by a fixation element. Such a design allows the usage of the same parts for the two different accommodations except for the fixation element. The fixation element can be attached to the rotor, the cartridge or the frame or to both. If the fixation element is attached to the rotor or forms part of the rotor, a part of the cartridge or the frame can abut the fixation element. Alternatively, if the fixation element is attached to the cartridge or the frame or forms part of them, a part of the rotor can abut the fixation element.

In a further embodiment, the at least one pivot accommodation comprises an abutment, which prevents the sample processing cartridge from pivoting over a predefined angle. A corresponding abutting element can be arranged on the sample processing cartridge or on the frame for receiving the sample processing cartridge. As the free pivoting motion allowing an angular deviation of 0 degrees to about 90 degrees, the design with an abutment allows the selective setting of the angular motion of the sample processing cartridge in the range of greater than 0 degrees to smaller than 90 degrees. With this, the content of the sample processing cartridge can be moved at an angle with respect to the orientation of the sample processing cartridge.

The features of the above-mentioned embodiments of the centrifugal processing unit can be used in any combination, unless they contradict each other.

A centrifugal processing system for directing the movement of substances within a sample processing cartridge comprises a centrifugal processing unit according to one of the above-mentioned embodiments and at least one manipulator adapted to be able to arrange the sample processing cartridge in the at least one accommodation or to remove it therefrom. The arrangement and removal with a manipulator allows for a precise and fast process.

In an embodiment, the manipulator is adapted to be able to move the sample processing cartridge in any horizontal or vertical direction. With such a manipulator, a cartridge from one side of the rotor can be transferred to the opposite side of the rotor, thereby the orientation of the cartridge with respect to the rotor has changed by 180 degrees. For the transfer of another cartridge, the rotor must be rotated by an angle corresponding to the angular distribution of the cartridge accommodations around the rotor.

In a further embodiment, the manipulator is adapted to be able to perform an angular rotation of the sample processing cartridge about a central axis parallel to the rotor axis. This allows a quick rotation of the cartridge and subsequently the application of the centrifugal force in another direction. For the transfer of a cartridge in any one of the accommodations to another accommodation, the rotor needs not be rotated. Alternatively, the rotor can be rotated in order to improve the accessibility of cartridges.

According to another embodiment, the angular rotation is a rotation about an angle greater than 0 degrees, particularly 90 degrees or 180 degrees. The advantages thereof have been described above.

In another embodiment, the centrifugal processing system further comprises at least one additional station, wherein the at least one additional station can be selected from the group of loading/unloading station, pipetting station, sealing station, irradiation station, heating station, detection/quantification station, identification station or any other commonly known station for the treatment of the content of a sample processing cartridge or the handling of a sample processing cartridge. The incorporation of these additional stations provides a wide variety of options and allow a versatile use of the system.

These stations can be arranged next to each other on a single base. Additionally, they can be allocated within an accessible housing. The housing can comprise a cover or lid that can be removed or opened, partially of fully.

The loading and unloading can be at the same place or can be allocated at various places, i.e. a loading station and an unloading station. These stations can provide space for individual cartridges or for carriers for several cartridges.

In the pipetting station, reaction components, such as samples, reagents, reconstitution buffers or the like can be added, mixed or transferred.

In the sealing station, the cartridges are sealed to prevent substances from leaving or entering the cartridges.

In the irradiation station, the cartridge, respectively its content can be exposed to any kind of irradiation. The irradiation can be electromagnetic or radioactive, such as light, electromagnetism, radioactivity or the like.

In the heating station, the content of the cartridges can be exposed to heat introduced by contact, convection, conduction or irradiation. The heating station can be an isothermal incubator, wherein the temperature is held constant over time. Temperatures from 4 to 98 degrees Celsius is a suitable temperature range. Alternatively, the heating station can be a gradient incubator or thermocycler, wherein heating gradients or cooling gradients or combinations thereof can be realised. It is also possible to introduce temperature plateaus, wherein the temperature is held constant over a period.

In the detection/quantification station, any kind of optical or electronical detection and/or quantification of detection and/or quantification targets can be realised.

In the identification station, the cartridges can be identified by means of a one-dimensional or two-dimensional barcode scanner or a RFID scanner or an imaging system.

The features of the above-mentioned embodiments of the centrifugal processing system can be used in any combination, unless they contradict each other.

A process for directing the movement of substances within a sample processing cartridge comprises the steps of:
Providing a centrifugal processing unit according to one of the above-mentioned embodiments;
Inserting a sample processing cartridge in a pivot accommodation;
Rotating the at least one rotor about the respective rotor axis to create a centrifugal force, while allowing a free pivoting motion of the inserted sample processing cartridge and thereby creating a force vector in a first direction with respect to the sample processing cartridge;
Removing the sample processing cartridge from the pivot accommodation;
Inserting the sample processing cartridge in a fix accommodation;
Rotating the at least one rotor about the respective rotor axis to create a centrifugal force, while a free pivoting motion of the inserted sample processing cartridge is prevented and thereby creating a force vector in a second direction with respect to the sample processing cartridge.

The advantages of the centrifugal processing unit or the centrifugal processing system apply as well to the process for directing the movement of substances within a sample processing cartridge.

In an embodiment, the process further comprises the steps of:
Rotating the sample processing cartridge about a central axis parallel to the rotor axis before inserting it in the fix accommodation and thereby enabling the creation of a force vector in a third direction with respect to the sample processing cartridge when the at least one rotor is rotated about the respective rotor axis.

In a further embodiment, the process further comprises the steps of:
Positioning of the sample processing cartridge in an at least one additional station before or after inserting the sample processing cartridge in the pivot accommodation or the fix accommodation, wherein the at least one additional station can be selected from the same group as the one from the centrifugal processing system.

According to a further embodiment, the inserting, the removing, the rotating and/or the positioning of the sample processing cartridge is performed by at least one manipulator.

According to a further embodiment, the free pivoting motion of the sample processing cartridge is partially restricted by providing the pivot accommodation with an abutment before the at least one rotor is rotated. The abutment can be provided initially or just before the rotation of the rotor. It is also possible to provide such angularly restricted accommodations from the beginning, i.e. as factory setting or to place an abutment in a respective accommodation at the latest, just before the rotor is rotated by hand or by manipulator. It is also possible to allocate an abutment at the accommodation between these two points in time.

The features of the above-mentioned embodiments of the process for directing the movement of substances within a sample processing cartridge can be used in any combination, unless they contradict each other.

BRIEF DESCRIPTION OF THE DRAWINGS

Embodiments of the current invention are described in more detail in the following with reference to the figures. These are for illustrative purposes only and are not to be construed as limiting. It shows FIG. 1 a side view of a centrifugal processing unit according to the invention.

DETAILED DESCRIPTION OF THE INVENTION

Figure 1:
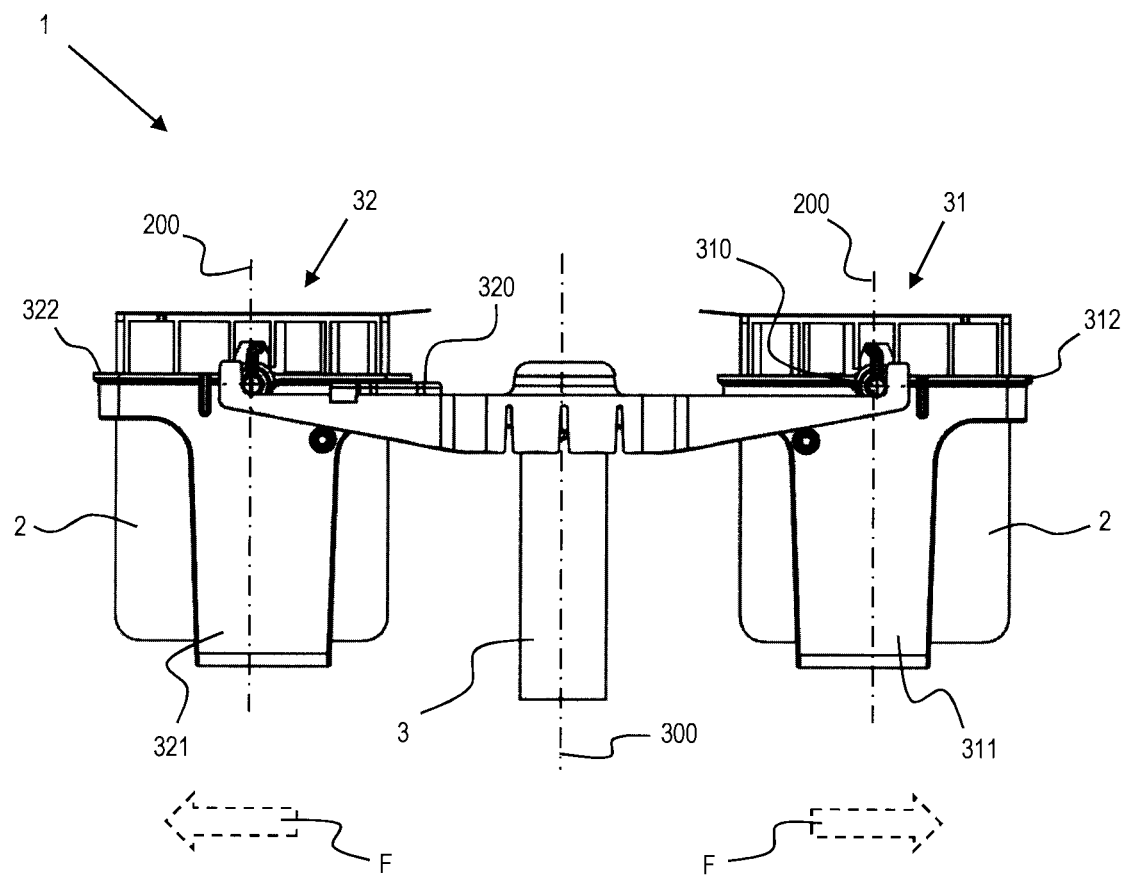
Figure 2:
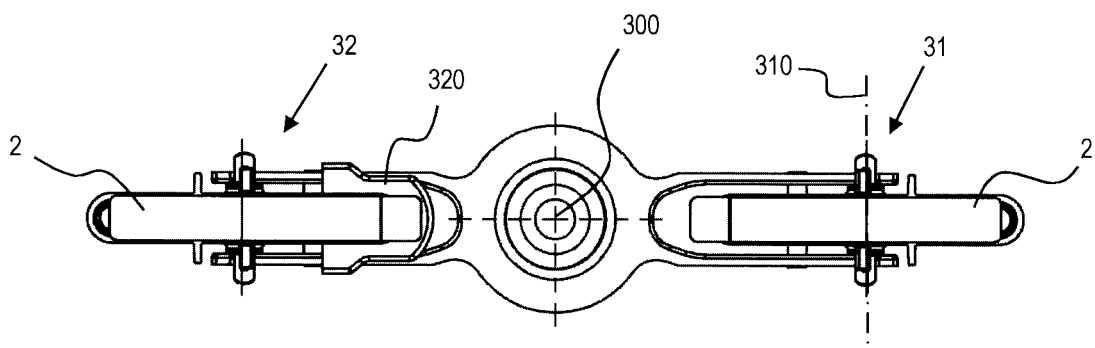
FIG. 2 a top view of the centrifugal processing unit of FIG. 1.

FIG. 1 shows a side view and FIG. 2 a top view of a centrifugal processing unit 1 according to the invention. The centrifugal processing unit 1 for directing the movement of substances within a sample processing cartridge 2 comprises a rotor 3 for receiving the sample processing cartridge 2, at least one rotor drive (not shown) for rotating the at least one rotor 3 about a respective rotor axis 300 to create a centrifugal force F, a control (not shown) for accelerating and decelerating the at least one rotor 3. The rotor 3 comprises two arms that extend laterally from the central rotor axis 300 on opposite sides from the rotor axis 300. The centrifugal processing unit 1 further comprises a pivot accommodation 31 and a fix accommodation 32 for receiving the sample processing cartridge 2. The pivot accommodation 31 and the fix accommodation are arranged on the rotor 3, wherein the pivot accommodation 31 being adapted to allow a free pivoting motion of the received sample processing cartridge 2 about a respective pivot axis 310. The pivot axis 310 is orthogonal to the rotor axis 300 and to the respective force vector F of the centrifugal force. The two accommodations are allocated one at each of the free ends of the two rotor arms. The pivot accommodation 31 and the fix accommodation 32 each comprises a frame 311, 321 for receiving the sample processing cartridge 2. The frame of each accommodation is adapted for receiving the sample processing cartridge 2 in a first orientation and for receiving the sample processing cartridge 2 in a second orientation, wherein the second orientation corresponds to an angular rotation of 180 degrees of the sample processing cartridge 2 about a central axis 200 parallel to the rotor axis 300. Each frame comprises a respective flange 312, 322 at its upper rim. Each flange is extending outwards. The fix accommodation 32 comprises a fixation element 320. The fixation element 320 is attached to the arm with the fix accommodation 32 of the rotor 3. The fixation element 320 is u-shaped and is arranged between the arm of the rotor 3 and the flange 322 of the respective frame 321. The lower surface of the flange 322 abuts the upper surface of the fixation element 320 and thereby prevents a tilting motion of the frame, when the rotor 3 is in motion. As the arm of the rotor 3 is bifurcated, one shank of the fixation element 320 is attached to one side of the rotor arm and the other shank of the fixation element 320 is attached to the other side of the rotor arm. The connecting portion between the two shanks allows for an easy mounting and removal of the fixation element 320 and ensures a good fixation of the frame 321 with respect to the rotor arm. The fixation element 320 can be snapped on the rotor arm. Apart from the fixation element 320, the pivot accommodation 31 and the fix accommodation 32, including the respective frames 312, 322, are designed identically.

Figure 3:
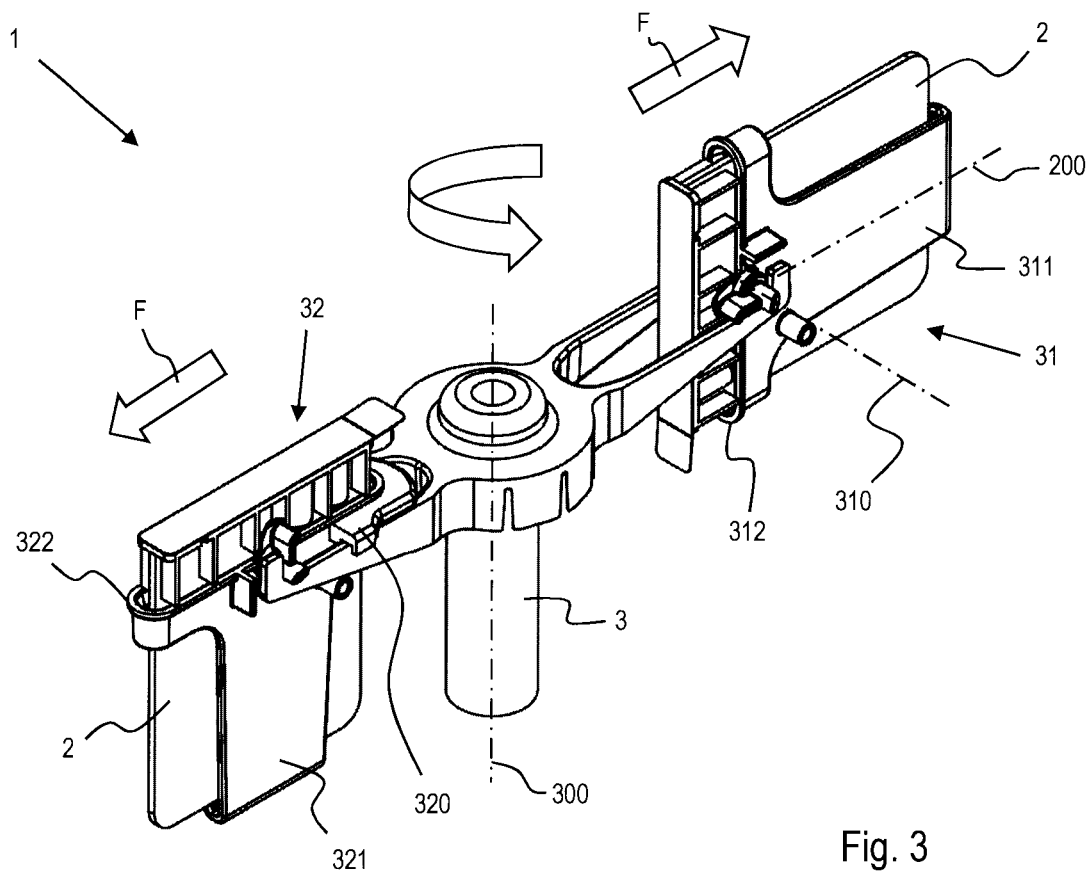
FIG. 3 an isometric view of the centrifugal processing unit of FIG. 1 during rotation.

FIG. 3 shows an isometric view of the centrifugal processing unit of FIG. 1 during rotation. When turned, due to the centrifugal force, the frame 311 together with the therein received cartridge 2 of the pivot accommodation 31 performs a pivoting motion about pivot axis 310. In the depicted case, the angular deflection of the cartridge in the rotated state with respect to its position of rest is about 90 degrees. Due to the fixation element 320, the cartridge 2 together with the fix accommodation is not pivoting.

Figure 4:
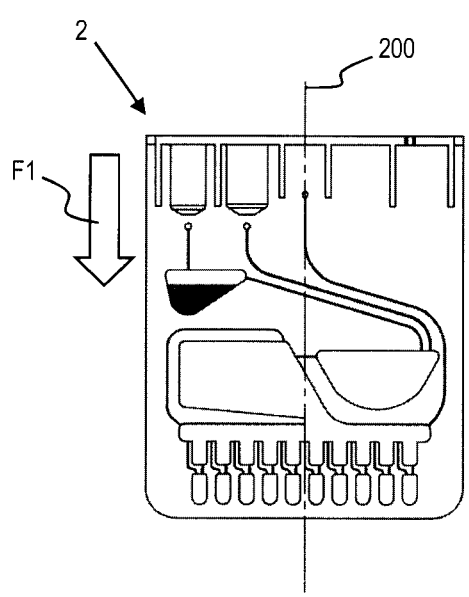
FIG. 4 a sample processing cartridge received in a pivot accommodation during rotation.

FIG. 4 shows a sample processing cartridge 2 received in a pivot accommodation during rotation. For a better visibility, only the cartridge 2 is shown. During the rotation of the rotor 3, the centrifugal force F acts on the cartridge in a first direction, resulting in a first force vector F1 acting on substrates to be moved within the sample processing cartridge 2 and directing them in the first direction. With respect to the orientation of the cartridge in its position of rest, the first force vector points downwards. Thus, substances that have been inserted into the cartridge at its top, are moved downwards. In the pivot accommodation 31, the resulting force vector always points downwards, even when the cartridge is rotated about its central axis 200.

Figure 5:
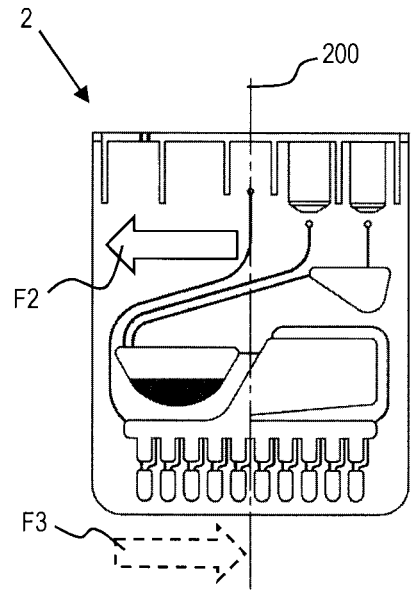
FIG. 5 a sample processing cartridge received in a fix accommodation during rotation.

FIG. 5 shows a sample processing cartridge 2 received in a fix accommodation 32 during rotation. For a better visibility, only the cartridge 2 is shown. During the rotation of the rotor 3, the centrifugal force F acts on the cartridge in a second direction, resulting in a second force vector F2 acting on substrates to be moved within the sample processing cartridge 2 and directing them in the second direction. With respect to the orientation of the cartridge in its position of rest, the second force vector F2 points to one side. Thus, substances within the cartridge are moved to that side. When the cartridge in the fix accommodation 32 is rotated about its central axis 200, the centrifugal force F acts on the cartridge in a third direction, essentially opposite to the second direction, during the rotation of the rotor 3, resulting in a third force vector F3 acting on the substrates in the cartridge and moving them in the third direction. With respect to the orientation of the cartridge in its position of rest, the third force vector F3 points essentially to the opposite direction than the second force vector F2. Thus, substrates within the cartridge are moved towards that side.

Figures 6, 7:
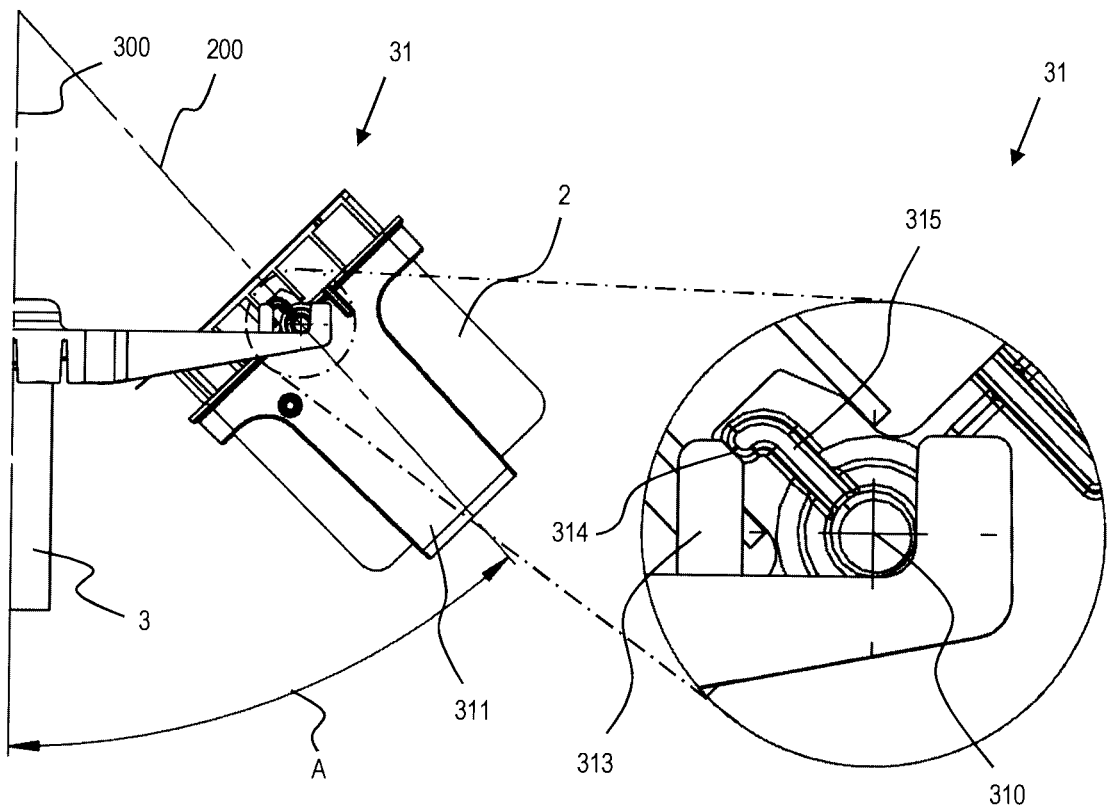
FIG. 6 a partial side view of a centrifugal processing unit with a restricted angular deviation at the pivot accommodation.
FIG. 7 a detail of the pivot accommodation of FIG. 6.

FIG. 6 shows a partial side view of a centrifugal processing unit 1 with a restricted angular deviation A at the pivot accommodation 31 and FIG. 7 shows a detail of the pivot accommodation 31 of FIG. 6. On the rotor arm, close to the pivot axis 310, an abutment 313 is arranged. The abutment 313 extends upwards from the rotor arm and comprises an abutment surface 314 at its upper end region. The abutment surface 314 is designed for contacting an abutting element 315 that is arranged on the frame 311 of the pivot accommodation 31. The abutting element 315 extends radially upwards from the pivot axis 310, in the static condition, when the rotor 3 is not rotating. In the static condition, there is a free space between the abutment 313 and the abutting element 315. When the rotor 3 rotates, the frame 311 pivots about the pivot axis 310 and the abutting element 315 performs a pivoting motion and thus the free space is reduced until the abutting element 315 touches the abutment 313. The bigger the free space in the static condition, the bigger is the possible angular deviation of the frame 311 with respect to the rotor. The smaller the height of the abutment 313, the bigger the free space in the static condition. With this combination of abutment 313 and abutting element 315, angular deviations from bigger than 0 degrees and smaller than 90 degrees can be realised.

Figure 8:
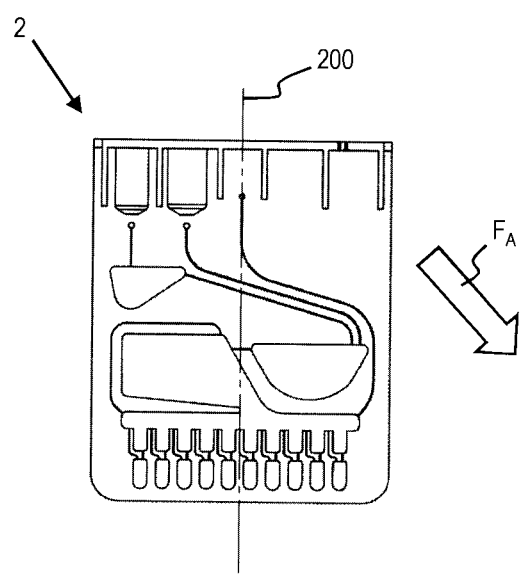
FIG. 8 a sample processing cartridge received in the pivot accommodation of FIG. 7.

FIG. 8 shows a sample processing cartridge received in the pivot accommodation of FIG. 7 with a resulting angular force vector $F_A$ of about 45 degrees.

Different abutments 313 at different rotor arms enable different resulting force vectors acting on the cartridge 2 inserted in the respective frame. By placing a cartridge 2 subsequently in different positions of the rotor 3, i.e. in different frames of the centrifugal processing unit 1, different resulting force vectors can be applied correspondingly on said cartridge 2. This increases the possible paths that a liquid can take within a cartridge.

Figure 9:
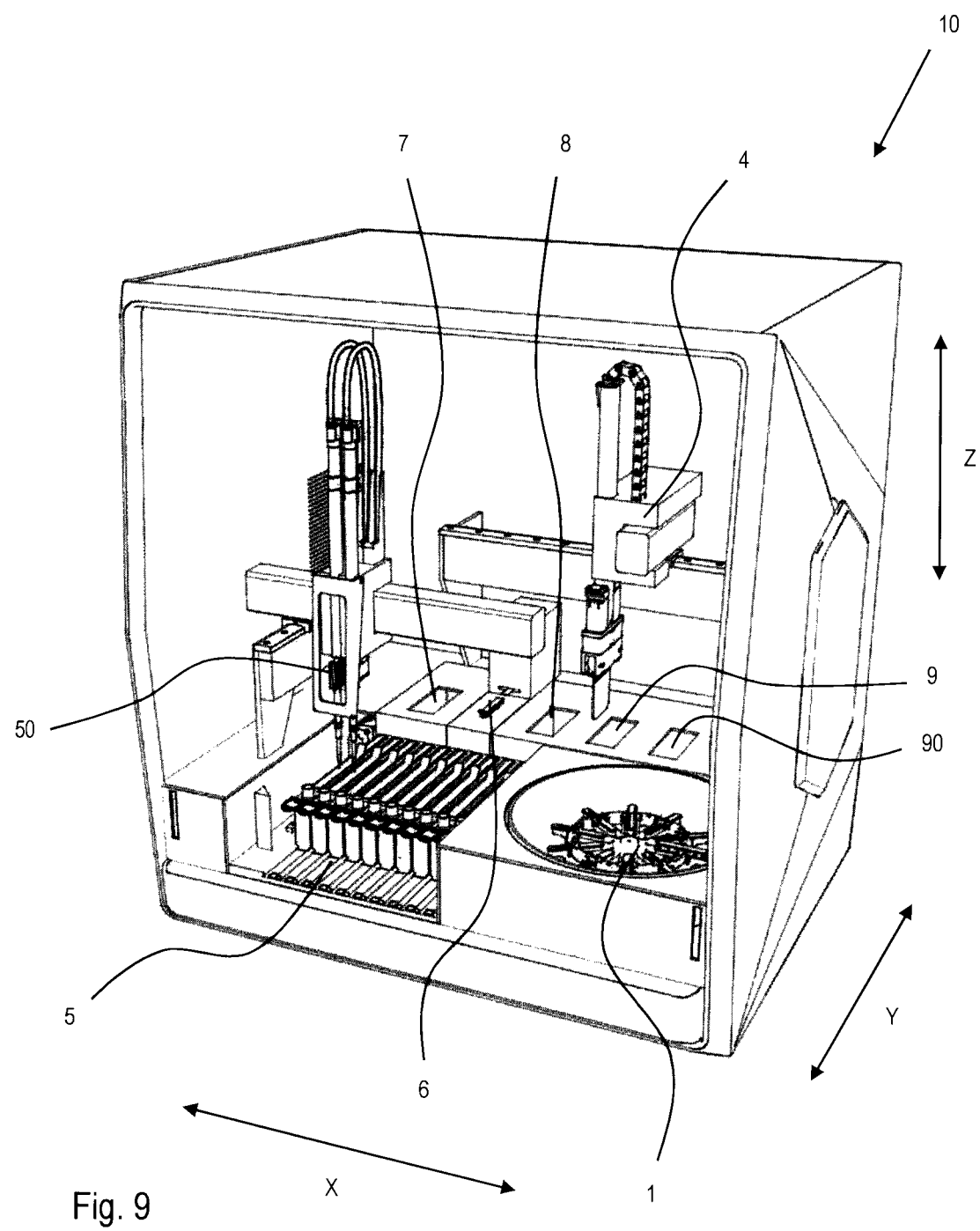
FIG. 9 a centrifugal processing system with a centrifugal processing unit of FIG. 1.

FIG. 9 shows a centrifugal processing system with a centrifugal processing unit 1. The centrifugal processing unit 1 is mounted on a base. A manipulator 4, a loading/unloading station 5, a sealing station 6, an irradiation station 7, a heating station 8, a detection/quantification station 9 and an identification station 90 are mounted on the same base. The base with the manipulator and all the stations are enclosed by a housing. The inside of the housing can be accessed by means of a hinged lid. This is favourable for maintenance. During normal operation, the loading/unloading station 5 is the only connection between the inside and the surrounding. The manipulator 4 is adapted to insert/remove a sample processing cartridge 2 in/from the centrifugal processing unit 1. The manipulator 4 can perform horizontal movements along horizontal axes X, Y and vertical movements along a vertical axis Z. Additionally, the manipulator 4 can rotate a cartridge about the vertical axis Z.

REFERENCE SIGNS LIST

1 Centrifugal processing unit
10 Centrifugal processing system
2 Sample processing cartridge
200 Central axis
3 Rotor
300 Rotor axis
31 Pivot accommodation
310 Pivot axis
311 Frame
312 Flange
313 Abutment
314 Abutting surface
315 Abutting element
32 Fix accommodation
320 Fixation element
321 Frame
322 Flange
4 Manipulator
5 Loading station
6 Sealing station
7 Irradiation station
8 heating station
9 detection/quantification station
90 identification station
F Centrifugal force
F1 Force vector
F2 Force vector
F3 Force vector
A Angle
$F_A$ Force vector

The invention claimed is:

1. A centrifugal processing unit (1) for directing the movement of substances within a sample processing cartridge (2), the centrifugal processing unit (1) comprising:
   at least one rotor (3),
   at least one rotor drive for rotating the at least one rotor (3) about a respective vertical rotor axis (300) to create a centrifugal force (F),
   a control for accelerating and decelerating the at least one rotor (3),
   characterized in that the centrifugal processing unit (1) further comprising at least one pivot accommodation (31) for receiving a sample processing cartridge (2) and at least one fix accommodation (32) for receiving the sample processing cartridge (2) that are arranged on the at least one rotor (3), wherein each pivot accommodation (31) being adapted to allow a free pivoting motion of the received sample processing cartridge (2) about a respective pivot axis (310), wherein each pivot axis (310) being orthogonal to the vertical rotor axis (300) and to the respective force vector of the centrifugal force (F), and wherein each fix accommodation (32) comprising a fixation element (320) to prevent any pivoting motion of the received sample processing cartridge (2).

2. The centrifugal processing unit (1) according to claim 1, wherein each accommodation (31, 32) being adapted for receiving the sample processing cartridge (2) in a first orientation and for receiving the sample processing cartridge (2) in a second orientation, wherein the second orientation corresponds to an angular rotation of the sample processing cartridge (2) about a central axis (200) parallel to the vertical rotor axis (300).

3. The centrifugal processing unit (1) according to claim 2, wherein the angular rotation between the first orientation and the second orientation of the sample processing cartridge (2) is a rotation about an angle greater 0 degrees and up to 180 degrees, particularly 90 degrees or about an angle of 180 degrees.

4. The centrifugal processing unit (1) according to claim 1, wherein the at least one accommodation (31, 32) comprises a frame (311, 321) for receiving the sample processing cartridge (2).

5. The centrifugal processing unit (1) according to claim 1, wherein the at least one pivot accommodation (31) comprises an abutment (313), which prevents the sample processing cartridge (2) from pivoting over a predefined angle (A).

6. A centrifugal processing system (10) for directing the movement of substances within a sample processing cartridge (2), the centrifugal processing system (10) comprising:
 a centrifugal processing unit (1) according to claim 1 and
 at least one manipulator (4) adapted to be able to arrange the sample processing cartridge (2) in the at least one accommodation (31, 32) or to remove it therefrom.

7. The centrifugal processing system (10) according to claim 6, wherein the manipulator (4) is adapted to be able to move the sample processing cartridge (2) in any horizontal or vertical direction (X, Y, Z).

8. The centrifugal processing system (10) according to claim 6, wherein the manipulator (6) is adapted to be able to perform an angular rotation of the sample processing cartridge (2) about an axis (Z) parallel to the vertical rotor axis (300).

9. The centrifugal processing system (10) according to claim 8, wherein the angular rotation is a rotation about an angle greater than 0 degrees, particularly 90 degrees or 180 degrees.

10. The centrifugal processing system (10) according to claim 6, wherein the centrifugal processing system (10) further comprises at least one additional station, wherein the at least one additional station can be selected from the group of loading/unloading station (5), sealing station (6), irradiation station, heating station, detection/quantification station, identification station or any other commonly known station for the treatment of the content of a sample processing cartridge (2) or the handling of a sample processing cartridge (2).

11. A process for directing the movement of substances within a sample processing cartridge (2), the process comprising the steps of:
 Providing a centrifugal processing unit (1) according to claim 1;
 Inserting a sample processing cartridge (2) in a pivot accommodation (31);
 Rotating the at least one vertical rotor (3) about the respective rotor axis (300) to create a centrifugal force (F), while allowing a free pivoting motion of the inserted sample processing cartridge (2) and thereby creating a force vector (F1) in a first direction with respect to the sample processing cartridge (2);
 Removing the sample processing cartridge (2) from the pivot accommodation (31);
 Inserting the sample processing cartridge (2) in a fix accommodation (32);
 Rotating the at least one rotor (3) about the respective vertical rotor axis (300) to create a centrifugal force (F), while a free pivoting motion of the inserted sample processing cartridge (2) is prevented and thereby creating a force vector (F2) in a second direction with respect to the sample processing cartridge (2).

12. The process according to claim 11, wherein the process further comprising the steps of:
 Rotating the sample processing cartridge (2) about a central axis (200) parallel to the vertical rotor axis (300) before inserting it in the fix accommodation (32) and thereby enabling the creation of a force vector (F3) in a third direction with respect to the sample processing cartridge (2) when the at least one rotor (3) is rotated about the respective vertical rotor axis (300).

13. The process according to claim 11, wherein the process further comprising the steps of:
 Positioning of the sample processing cartridge (2) in an at least one additional station before or after inserting the sample processing cartridge (2) in the pivot accommodation (31) or the fix accommodation (32), wherein the at least one additional station can be selected from the group of loading/unloading station (5), sealing station (6), irradiation station (electromagnetic, radioactive), heating station (contact, convection), detection/quantification station, unloading station, identification station.

14. The process according to claim 11, wherein the inserting, the removing, the rotating and/or the positioning of the sample processing cartridge is performed by at least one manipulator (6).

15. The process according to claim 11, wherein the free pivoting motion of the sample processing cartridge (2) is partially restricted by providing the pivot accommodation (31) with an abutment (313) before the at least one rotor (3) is rotated.

* * * * *